Oct. 29, 1935.  C. R. PATON  2,018,870
MOTOR VEHICLE
Filed Dec. 21, 1931
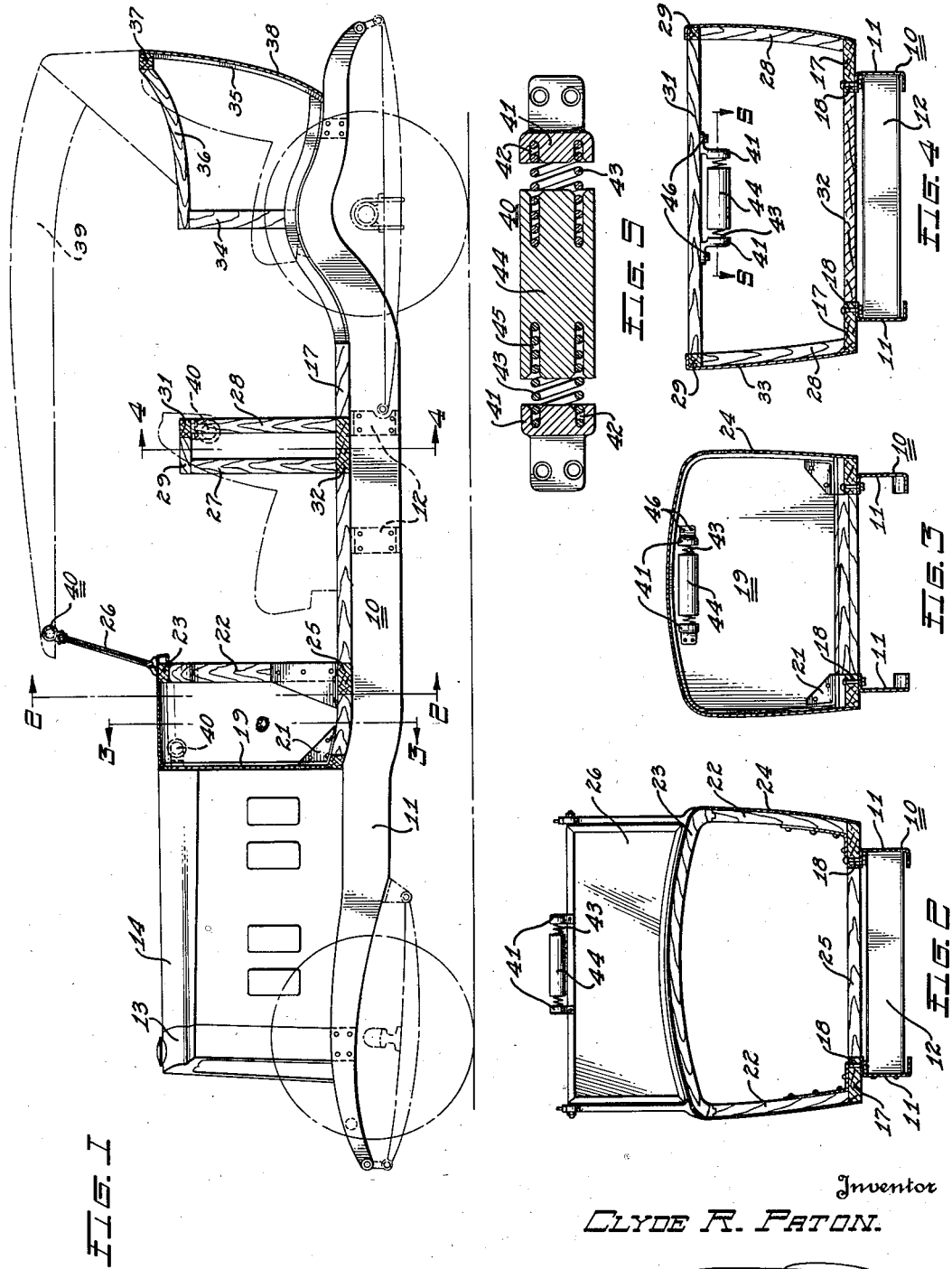
Inventor
CLYDE R. PATON.
By
Attorney Patented Oct. 29, 1935

2,018,870

UNITED STATES PATENT OFFICE 2,018,870

MOTOR VEHICLE

Clyde R. Paton, Birmingham, Mich., assignor to Packard Motor Car Company, Detroit, Mich., a corporation of Michigan Application December 21, 1931, Serial No. 582,307

12 Claims. (Cl. 296—1)

This invention relates to motor vehicles and particularly to vibration damping means adapted to co-operate with the body and other stationary parts of the vehicle.

The course of motor vehicle design progress has been influenced by several factors which have not been of a constant relative importance, but of a varying importance with the lapse of time. Body and frame design have also been influenced by factors of varying importance, and while it may perhaps be impossible to locate definitely all the factors affecting automobile design, it is interesting to trace some of the changing trends in order more fully to understand the problems now facing the body and frame designer.

When motor vehicles were first made to run, the major problem was to obtain continuous performance and the solution of this problem centered around the mechanical moving parts which had been added to the old carriage structures. In time, the motor and its associated parts became capable of continually driving the carriage chassis and body for long times at speeds which were higher than the carriage chassis was built to endure on the roads of those days. During this period it might be said that comfort, speed, acceleration, weight, and freedom from vibrations were subordinated to reliability.

The attainment of reliability marks the first body and chassis change point. Style and protection from the elements then began to be factors of importance and the body and chassis were redesigned until a vehicle was developed capable of holding together for relatively long periods of time at the 20 mile an hour road speeds which by this time were commonly attained. Generally speaking, the design practice in these days was to increase the size of the part that broke. After following this practice for some years, the motor vehicle was finally a reliable article, not apt to be seriously affected by all normal driving on all normal roads, but the car weighed an unconscionable amount for the relatively meager performance attained. Also, the car was not very comfortable—it had no acceleration or speed. At this point vibration, as we understand the term today, had not begun to appear. 2000 R. P. M. was then considered a very high motor speed and the body and frame structure was sufficiently rigid so that the motor vibrations at this relatively low motor speed were not able to induce synchronous vibration in these parts.

When a reliable vehicle had been obtained, speed began to be an important factor and then another era of motor progress was begun. It was soon found that an increase in motor power necessitated an increase in chassis strength and consequently weight. At the peak of this developmental period we find cars noticeably heavier, and it was then that the demand for greater acceleration began to be most evident.

In increasing the rate of acceleration, the vibration periods became more noticeable and as the maximum motor speeds increased upwardly of 3500 R. P. M., and as car speeds of 75 miles an hour were more commonly obtainable, high frequency vibration of the component parts of the frame and body structure became increasingly objectionable.

At this point it has become desirable to decrease the weight of the vehicle, and this trend is, of course, one which does not lend itself readily to reducing the vibration of the stationary parts of the vehicle which, as mentioned, include the body and the frame, because it is only natural to consider increasing the strength of the component parts of this structure in attempting to reduce their vibration. This cannot readily be done.

Vibrations of some kinds have already been generally greatly reduced so that they are no longer factors of such major importance as they used to be. I refer particularly to shimmy vibrations and vibrations due to torsional vibrations in the motor. Shimmy has been reduced to the point where its effect on the frame is almost negligible and some motors have been insulated from the frame and body so that such movements as they may still have are not transmitted to the frame. There remain, however, other vibrations which previously had not been in existence or had been of such a relatively small size that they were not objectionable. With high vehicle speeds, minor road irregularities are able, under some conditions, to set up a synchronous movement of the various parts of the frame and body. This movement is greatly assisted by the fact that the parts of the frame and body are relatively resilient, and when the rate, at which the vibrating forces are applied, increases it begins to approximate the natural rate of vibration of the resilient parts of the frame and body structure. This type of vibration has not previously been present in a great many vehicles because the various parts were made sufficiently rigid so that their rate of vibration was above any rate which could be applied by the roads of those days.

It is difficult accurately to segregate all the various vibrations now found in motor vehicles, but it is the primary purpose of this invention to damp those vibrations which might occur in the frame and body structure, that is, the stationary parts of the vehicle. This purpose is, of course, different from that which has actuated those designers who have been considering motor and shimmy vibrations, which are more or less inherent in all moving parts. The value of this invention will perhaps be better understood by bearing in mind the fact that I am here considering the frame and the parts associated therewith as a distinct structure subject to vibration as a whole and to vibrations between the component parts thereof. This structure excludes the motor, the driving mechanism, such as the axles, the wheels, and the springs, but includes the radiator, fenders, running boards, body, and hood, which parts are usually rigidly attached to the frame and form an integral structure therewith.

If this structure were absolutely rigid, there would be no synchronous vibratory movement between the parts thereof, but this structure is not rigid, and the automobile designer is forced to remedy the situation.

As previously suggested, an increase in weight of the various parts, or the addition of strengthening braces, cross-members, tie rods, or panels is one way of reducing the effect of some of these vibrations, but an increase in weight is not readily possible without seriously affecting speed, acceleration, or fuel economy. These three factors are items which cannot be adversely affected because there is still a demand for an increase in all of these items of performance. Since weight cannot be added, there is a clear indication that any increase made must be kept to a minimum. Strengthening of the parts would have a tendency to reduce frame and body vibration but this is not an altogether satisfactory course of procedure and consequently some other method must be used, and such other method forms the subject matter of this application.

Some bodies are quite rigid structures, and when attached to the frame have the effect of stiffening the frame by forming a box section therewith. When this occurs the frame and body assembly is relatively free from vibration along that portion of the frame which is reinforced by the body. Other types of bodies, on the other hand, are not sufficiently rigid along their length to have a sufficient reinforcing effect on the frame, and in motor vehicles equipped with these bodies, we find parts of the frame and body assembly co-acting to produce vibrations of varying magnitude along the length of the body. The reason for this has been found to lie partly in the fact that the assembly is too weak to resist forces causing torsional twisting of the frame in various directions. The forces tending to cause torsional movement of the frame and body structure about an axis substantially longitudinal of the assembly have been found to be particularly objectionable.

It is evident that the best body frame work for reducing torsional frame movements about a longitudinal axis would be one with a diagonally braced box section. Even a box section without diagonal braces would be of assistance provided the box section had sufficient depth in a direction perpendicular to the axis of the vibration. On the other hand, it is also evident that diagonal braces are not possible at all points along the frame axis because of interference with the passengers, and consequently the frame and body structure has less resistance to torsional movements than is desirable. This is particularly noticeable in open bodies such as touring cars and roadsters, and in convertible bodies such as coupes, victorias and sedans.

Considering now the frame and body structure in an open car, we see that the dash, the front seat back and the rear seat back are substantially the only torsional body stiffening means present. In a car equipped with an open body and a rubber mounted motor, there is also the unsupported frame section between the dash and the radiator. Thus along the length of the frame and body structure we find a few points at which torsional rigidity is present, but between these points we have only a torsional stiffness of the frame to prevent vibration, and I have found that this stiffness is oftentimes not sufficient.

I have referred to a longitudinal axis about which the body and frame structure may vibrate. This axis will not necessarily have the same location in each type of body or in the same body with different loads, but it may be said to pass through the centers of oscillation of the various body and frame sections taken on planes perpendicular to the length of the axis. At any section so taken on any car, its position may readily be obtained by means of a chassis dynamometer and a stroboscope, in a manner which is well known in the art. Generally speaking, this axis will lie close to the plane of the frame, midway laterally of its width, and substantially parallel thereto, though, as I have indicated, its position is by no means to be considered as being standard in all vehicles of the same type, or even constant.

One of the objects of this invention is to decrease the frame and body vibrations without an accompanying major increase in the weight of the component parts.

Another object of my invention is to reduce torsional frame and body movements about a longitudinal axis.

Another object of my invention is to so locate my vibration damping means with respect to the axis about which the structure vibrates that a minimum of weight will be added to the completed vehicle.

Another object of the invention is to apply vibration damping means to the length of the frame and body structure at the weakest sections.

Other objects of the invention will appear from the following description taken in connection with the drawing, which forms a part of this specification, and in which:

Fig. 1 is a side elevation partly sectioned of a portion of a motor vehicle incorporating my invention, Fig. 2 is a section taken on the line 2—2 of Fig. 1, Fig. 3 is a section taken on the line 3—3 of Fig. 1, Fig. 4 is a section taken on the line 4—4 of Fig. 1, and Fig. 5 is an enlarged view taken on the line 5—5 of Fig. 4.

Referring to the drawing, 10 illustrates a vehicle frame forming the longitudinal reinforcing member of a motor vehicle. The frame consists of two flanged side rails 11 connected by cross-members 12, and is supported by what might be termed the running gear which includes suitable springs, axles, and wheels, and is propelled by a suitable power plant, not shown. These parts are all subject to movements of their own with respect to the frame.

Directly associated with the frame and normally not subject to movement with respect thereto is a radiator, a hood, a body structure, and vehicle protecting mechanism such as fenders, bumpers, and running boards, not shown. These parts, together with the frame, form an assembly, the parts of which are not subject to relative movement in the normal operation of the vehicle.

The stationary parts shown in the drawing are the radiator 13, the hood 14, and the body. The body shown is a touring car type, but, as previously explained, this is only one of the many types of bodies with which my invention is most advantageously used.

The body structure consists of frame-work which supports body panels, seats, the windshield, the top, and usually the rear end of the hood 14. In the drawing I have shown body sills 17 made of wood or metal or both, bolted to the frame, as at 18, at suitable points along its length. At or near the forward end of the sills is a dash panel 19 gussetted to the frame as at 21 and serving as a cross brace for the forward end of the body frame-work. Rearwardly of the dash are door hinge pillars 22 joined at their tops by a windshield or cowl bar 23. Supported by the dash, the door pillars and the cowl bar is a cowl panel 24, which may also be attached to the body sills. At some point above the cowl is a windshield 26 usually bolted through the cowl panel to the door hinge pillars or the cowl bar. At the door pillars the body cross bar 25 may laterally connect the body sills.

Along the length of the body, the next major reinforcement for the frame appears at the back of the front seat where I have shown front door lock pillars 27 and rear door lock pillars 28 connected longitudinally of the vehicle at their tops by a belt rail 29. The two rear door lock pillars 28 are usually also connected at their tops by a seat rail 31 suitably mortised in position. A cross bar 32 provides a lateral connection between the sills at this point and the body framework may be covered by suitable panelling such as 33.

Rearwardly of this point the body sills are unconnected except by cross bars until the back of the rear seat is reached. The rear door hinge pillars 34 cannot, of course, be connected at their tops without interfering with the passengers. There is usually provided a belt rail 36 running axially of the body to a point in back of the rear seat where the belt rails may be connected by a rear seat rail 37. In some bodies a strainer 35 is used to tie the rear seat rail 37 to the body sills and thus reinforce the rear portion of the body against torsional movements. Suitable quarter and back panelling 38 is supported by the rear body frame-work and forms an exterior body wall.

A collapsible top structure indicated at 39 usually covers the passenger compartment of the vehicle and is supported at its rear end by the belt rail 36 and at its forward end by the windshield 26. This structure is normally composed of parts offering only slight resistance to torsional frame and body vibration.

I have thus described a frame and body assembly consisting of relatively co-planar frame side rails and body sills reinforced at points spaced along the length of the assembly by box sections of varying strength located at the dash, the windshield, the front seat back, and the rear seat back. Between these sections, and particularly over those portions of the frame where the doors are located, there is relatively little resistance to torsional vibration.

Under the influence of rapidly repeated torsional forces resulting from wheel movement transmitted through the axles and the springs, I have found that the frame and body assembly behaves like a resilient structure and that various sections of the body are subjected to torsional vibrations about a longitudinal axis of varying amounts, depending upon various factors which include the comparative resistance of these sections to torsional vibration. There is thus a need along the length of the body for means to support the various sections against varying torsional vibrations. As a supporting and vibration damping means I propose to use a second vibratory system 40 attached to the frame and body assembly at the points which vibrate the most and including a mass capable of moving slightly. This movement is preferably resiliently opposed by supporting connections between the mass and the body part to which it is connected.

As shown, my secondary vibratory system includes a pair of spaced brackets 41 with opposed recesses 42 adapted for the reception and guidance of a pair of coil springs 43. Between the springs I have located a weight 44 suitably recessed as at 45 to permit the springs to guide it in its movement between the brackets and to prevent major displacement of the weight from the axis of the springs. In attaching this secondary vibratory system to my frame and body assembly, I place the axis of the springs in a plane perpendicular to the axis about which the frame and body section is vibrating, perpendicular to a radius from the axis at a point as far removed therefrom as is possible, and so closely attached, as with bolts 46, to the vibrating section of the assembly as to exercise a powerful direct dampening effect thereon.

The construction of the individual body and frame will determine the section on which my secondary system is to be mounted. My drawing indicates three possible locations, the position of which depends partly on the type of body, and partly on the particular frame construction used with the body. In some types of roadsters or coupés it is conceivable that the rear deck will serve so well to reinforce that section of the frame and body assembly as to render a vibration dampener unnecessary for that section of the axis. In some types of frames, the section forward of the dash may be so relatively weak as to require the mounting of the vibration damping means either on the radiator or the dash, that is, as close to the vibrating section as it can be placed.

In a good many types of bodies it may be found that the windshield section is subject to the most vibration. When this is the case, I propose to mount the secondary vibratory system above the windshield as shown in Fig. 2.

As an example of an installation suitable for the situation presented by some bodies, Fig. 3 shows my secondary vibratory system mounted on the dash. This location is indicated in dotted lines in Fig. 1.

A third location in which it may conceivably be found desirable to mount a secondary vibratory system is at the section over which the front seat back is located. This section is close to the portions of the frame and body covered by the doors which have no important torsional resistance and by mounting a weight 44 on the seat rail 31 as shown in Fig. 4, I have thus associated my secondary vibratory system with the frame at another point where vibration dampening means may be necessary.

A characteristic of the above described type of secondary vibratory system is the fact that the weight may be decreased in direct proportion to an increase in its distance from the longitudinal axis of the frame and body assembly about which vibration is occurring.

For this reason, it may well be that the windshield location shown in Fig. 2 will be the preferred location for my secondary vibratory system because in this location the additional weight required is a minimum.

As previously indicated, a chassis dynamometer and a stroboscope may be used in determining the amount of vibration and its rate. Once the rate is known, the required rate of spring action is also known and it is then a simple matter to obtain, by experiment, a weight of the size required to dampen the vibrations of the particular body section to which the secondary vibratory system is to be attached.

Heretofore at high speeds motor car bodies have been subject to a certain amount of windshield vibration, top vibration, side panel vibration, and hood vibration, but with a body equipped with second vibratory systems of the type illustrated, these vibratory movements so greatly reduced. This invention is particularly applicable to bodies with low torsional vibration resisting qualities such as open or convertible bodies, but it may also be used on bodies which are relatively stiff. In bodies of either type that portion of the strength of the body sections which is used to provide torsional stiffness may be greatly reduced and thus a saving in body frame-work strength may oftentimes be of an amount to provide a net reduction in weight of the vehicle even though weight is added when the secondary vibratory system is applied.

It should further be noted that the recesses in the mass 44 and in the brackets 41 have an axial length greater than the bottomed height of the coil springs. Thus, if the end face of the mass should strike one of the brackets, the springs will not thereby be bottomed and their life will be greatly increased by this provision against bottoming.

While a specific embodiment of the invention has been herein described, which is deemed to be new and advantageous and may be specifically claimed, it is not to be understood that the invention is limited to the exact details of the construction, as it will be apparent that changes may be made therein without departing from the spirit or scope of the invention.

Having thus described the invention, what is claimed and desired to be secured by Letters Patent is:

1. In a motor vehicle, the combination with a system including a frame subjected to torsional vibrations throughout its length about an axis substantially longitudinal thereof, of a secondary vibratory means associated with the system at substantially its point of least resistance to said vibrations, said means including a resiliently supported mass adapted to vibrate about the longitudinal vibration axis of the system to dampen or neutralize the vibration therein.

2. In a motor vehicle, a body subject to torsional vibrations about an axis longitudinal thereof of varying magnitudes along the length of said axis, and vibration dampening means associated with said body at substantially the point of least resistance to said vibration and located to shift about the longitudinal vibration axis of the body.

3. In a motor vehicle, the combination with a windshield and connections between said windshield and said vehicle, said connections being yieldable under motor vehicle operating conditions, the yielding of said connections tending to cause torsional windshield movement about an axis longitudinal of said vehicle, of resiliently mounted means associated with said windshield tending to hold it stationary with respect to said vehicle upon the yielding of said connections.

4. A vibration dampening means, for attachment to a motor vehicle, comprising spaced brackets adapted to be rigidly attached to said vehicle, a mass located between said brackets, the adjacent faces of the brackets and the mass being recessed, and coil springs extending into the adjacent recesses and connecting said mass to each of said brackets, the adjacent recesses in said mass and said brackets having a greater total length than the bottomed length of the springs therein.

5. A vibration dampening means, for attachment to a motor vehicle, comprising spaced brackets adapted to be rigidly attached to said vehicle, a mass located between said brackets, and unsecured coil springs connecting said mass to each of said brackets, end portions of the said coil springs encircling the opposed adjacent end portions of the mass and brackets.

6. A vibration dampening means, for attachment to a motor vehicle, comprising spaced brackets adapted to be rigidly attached to said vehicle, a mass movable between said brackets, and unsecured coil springs connecting said mass to each of said brackets, the end portions of said coil springs encircling the opposed adjacent end portions of the mass and the brackets, the adjacent encircled portions of the mass and brackets having a total length greater than the closed length of said coil springs.

7. In a vibration dampening system, a pair of spaced stationary members, a mass located between said members, said members and said mass being recessed, and unsecured yielding connecting means between and extending into the recesses in said mass and said members, said mass being guided and supported solely by said yielding means and said recesses.

8. In a motor vehicle, the combination with a structure comprising a frame and body subject to torsional vibrations about a neutral longitudinal axis, of vibration dampening means connected to said structure, said damping means being mounted for independent vibration about said axis.

9. In a motor vehicle, the combination with a structure comprising a frame and a body subject to torsional vibrations about a neutral longitudinal axis, of vibration means connected to a part of said structure, said means comprising a resiliently mounted weight subject to independent vibration about the longitudinal axis and movable in a direction opposing movements of the structure resulting from torsional vibrations.

10. In a motor driven vehicle, the combination with a body having length and forming a primary vibratory system subject to torsional vibrations about an axis extending substantially lengthwise of said body, said vibration varying in amplitude along the length of said axis, of a secondary vibratory system associated with said body at a point along the length of said axis where the vibrations are of high amplitude, said secondary vibratory system comprising a resiliently supported mass adapted to vibrate in substantially an arcuate path about said axis and to dampen the torsional vibrations of the primary vibratory system.

11. In a motor vehicle, the combination with a structure comprising a body frame and a windshield, said structure being subject to torsional vibration about an axis extending longitudinally thereof, of means associated with said windshield to dampen the vibration of said structure about said axis, said means being associated to vibrate about the longitudinal vibration axis of the structure.

12. In a motor vehicle, the combination with a structure comprising a frame and a body panel mounted on the frame, said structure being subjected to torsional vibratory impulses about an axis extending longitudinally thereof, of means directly associated with said panel and damping torsional vibrations of said structure, said means being arranged to vibrate arcuately about the longitudinal vibration axis of said structure.

CLYDE R. PATON.